Figure 4:
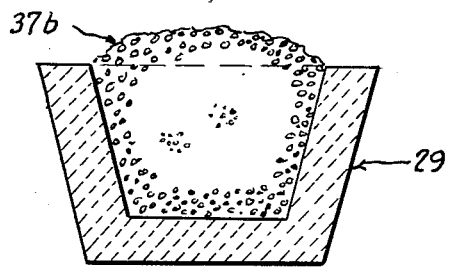

Oct. 6, 1964
G. SLAYTER
3,151,966
METHOD OF MAKING GLASS FOAM
Filed May 15, 1958
4 Sheets-Sheet 1
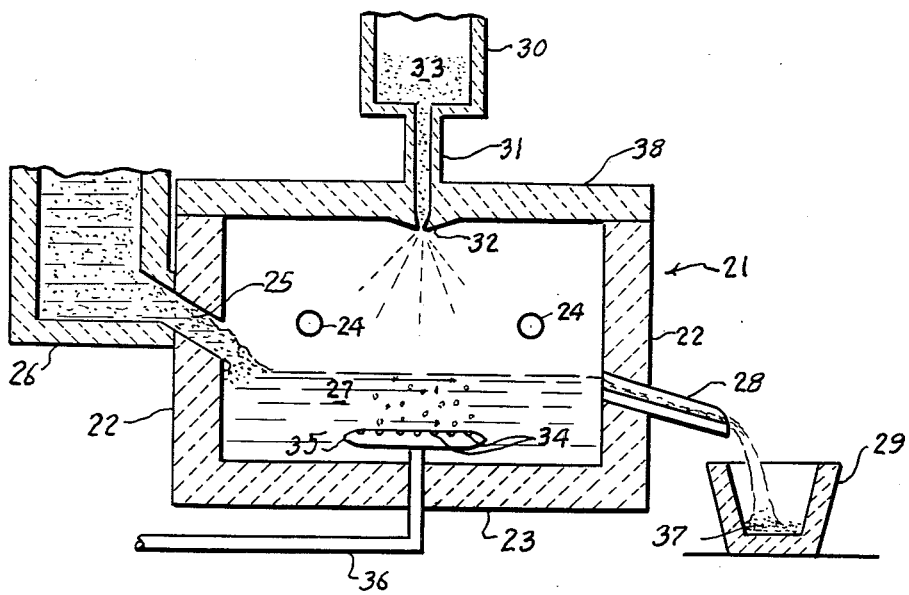
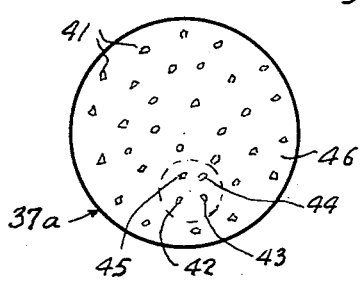
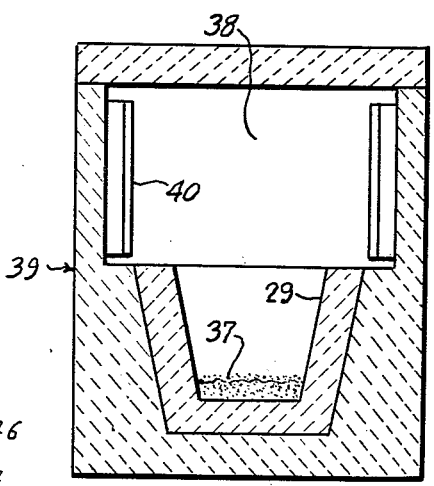
INVENTOR.
Games Slayter
BY Oct. 6, 1964

G. SLAYTER 3,151,966

METHOD OF MAKING GLASS FOAM

Filed May 15, 1958

4 Sheets-Sheet 2

INVENTOR.
Games Slayter
BY

Oct. 6, 1964        G. SLAYTER         3,151,966
           METHOD OF MAKING GLASS FOAM
Filed May 15, 1958                    4 Sheets-Sheet 3
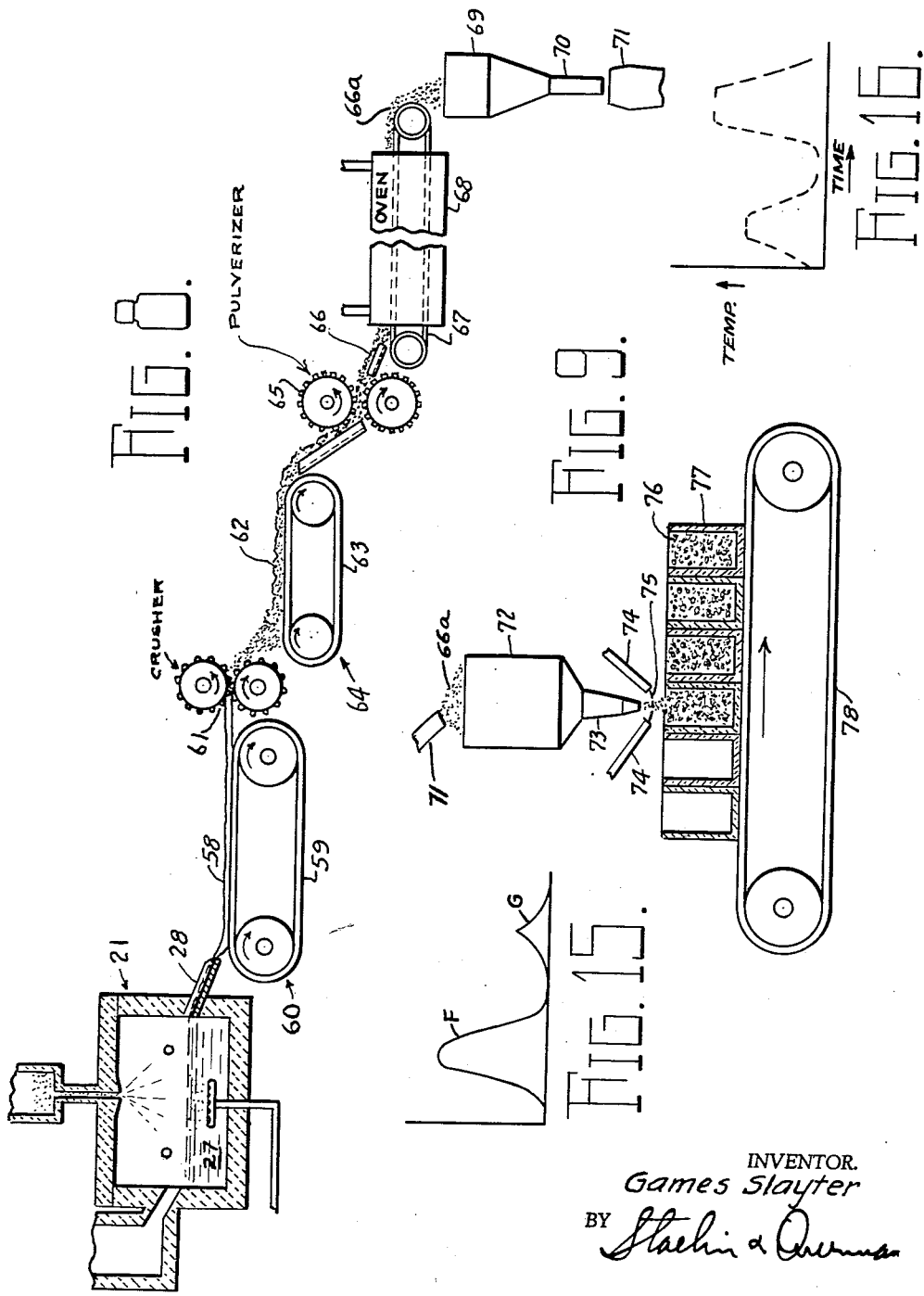
INVENTOR.
Games Slayter

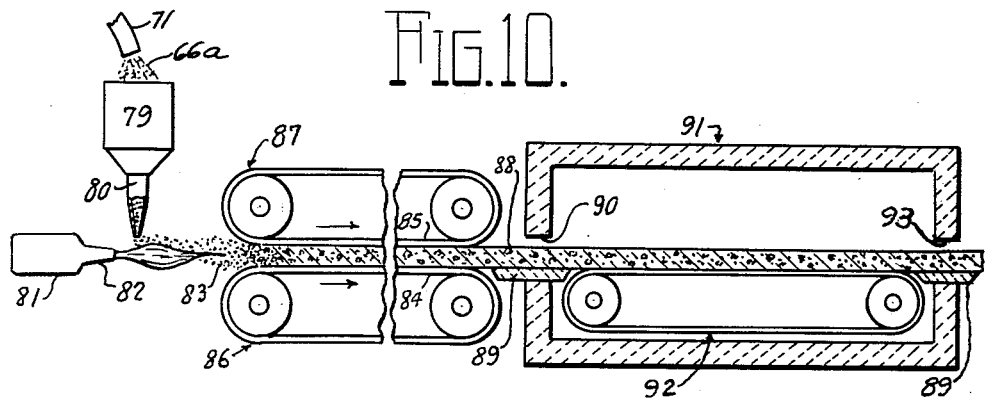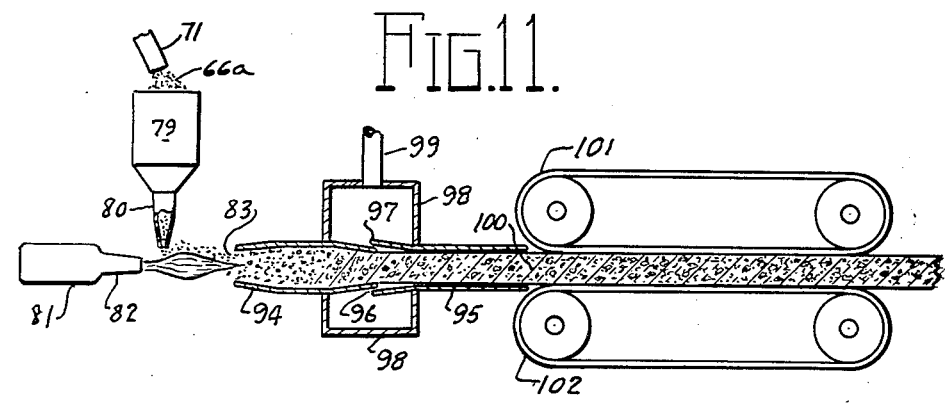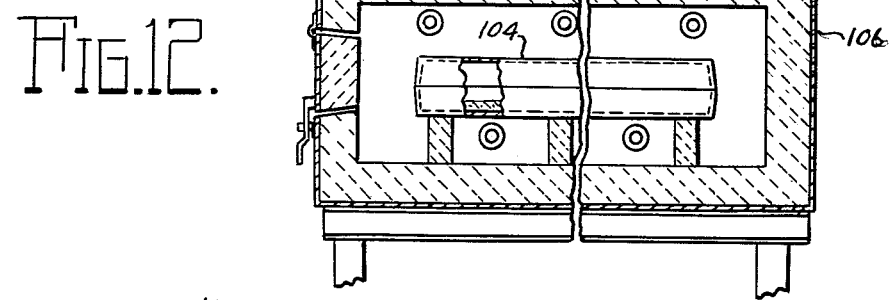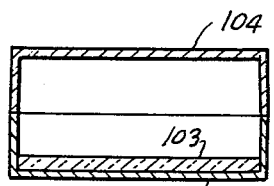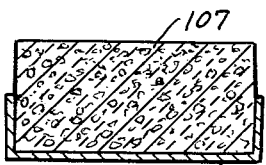

3,151,966
METHOD OF MAKING GLASS FOAM
Games Slayter, Newark, Ohio, assignor to Owens-Corning
Fiberglas Corporation, a corporation of Delaware
Filed May 15, 1958, Ser. No. 735,473
5 Claims. (Cl. 65—22)

This invention relates to glass foam and the formation thereof.

The present invention pertains to an improved glass foam of relatively high strength and uniformity and which can be made in varying densities for such widely different purposes as insulation and structural materials. The individual cells or bubbles in the new foam can contain a heavy gas that adds materially to the insulating properties and is then particularly suitable for insulating purposes when produced at 5–6 pounds per cubic foot apparent densities. Further, foam according to the invention contains a larger number of cells per unit of volume than previously known foams, so that walls of the cells, which are round in cross section due to their smaller size, can be thinner because the larger number of smaller cells nests together more completely. The thinner cell walls transfer less heat and also contribute to the improved insulating properties. The smaller cells also conduct less heat because there is reduced convection of the gases within the cells. For structural purposes, the foam can be produced in higher apparent densities of, for example, 10–12 pounds per cubic foot and as high as 30–40 pounds or more, and used as substitutes for such items as wooden boards, planks, sheets, and shingles. Such foam can be nailed, sawed, drilled, etc. in the same manner as wood. Further boards and the like made from the foam are fireproof, termite and vermin proof, and, of course, will not rot.

Glass foam according to the invention has an additional advantage in that a dense, unfoamed glass can be shipped, and subsequently foamed by the recipient. Thus, if the foam were to be used for structural purposes and made in California, it could be shipped to, say, Ohio, in the dense state as sheets or powder and foamed by a distributor into boards and the like. Also, where the foam is to be used for insulating purposes, it can be ground to a dense, powder form and subsequently foamed and blown into the body which is to be insulated, in one operation.

The term "blowing agent" is used herein, and in the appended claims, to refer to a material which can be dissolved in a glass, and which exists in the vaporous state, at least at elevated temperatures at which a glass is sufficiently soft that it can be foamed. Sulfur dioxide is a specific example of a blowing agent.

The term "nucleating agent" is used herein, and in the appended claims, to refer to a material which can constitute a part of an apparently homogeneous, vitreous glass, but which is preferentially in the form of nuclei, for example at a temperature below the minimum or above the maximum at which devitrification of other constituents of the glass occurs. Various nucleating agents are subsequently identified herein.

In one basic form of the invention, suitable known glass batch constituents are melted at a temperature above the maximum devitrification point or at a temperature at which the glass which is formed is stable in the vitrified condition. A blowing agent is then dissolved in the glass, preferably to the saturation point, and a nucleating agent is added thereto. A true solution apparently is formed by the gas and the glass, there being no bubbles visible in the glass at this time. The glass containing the nucleating agent and the blowing agent is cooled well below its minimum devitrification temperature, and is then reheated to a temperature sufficiently high that a multiplicity of minute nuclei of the nucleating agent form. After formation of the multiplicity of nuclei, the glass is heated to a temperature sufficiently high that the glass is softened and the nuclei grow into crystals. The crystals grow in size until they are large enough to constitute ready points of departure for the blowing agent, at which time the solubility of the blowing agent in the glass is greatly decreased because the blowing agent is insoluble in the crystals which are now present throughout the glass. At least a part of the blowing agent is then thrown out of solution in the glass, and collects around crystals or portions thereof as gas pockets or bubbles. Formation of the gas bubbles, and growth thereof, causes foaming of the glass. In addition, the blowing agent absorbs heat when it is thrown out of solution and converted to the vapor state, so that the glass is quickly cooled; its viscosity increases; and collapse of the cells is prevented. If desired, greater expression of the bubbles can be achieved by carrying out bubble formation in such an evacuated chamber as that disclosed in my prior U.S. Patents, 1,967,375 and 2,119,259.

The crystals in a foamed glass according to the invention become a part of the cell walls, which are, therefore, a two-phase material consisting of a glass matrix with the crystals embedded therein. The crystals may vary in composition, in which case the structure is better described as multi-phase. In either case, the cell walls will be exceptionally strong because they are composed of crystals embedded in a glassy matrix. The matrix has a modulus of elasticity of about ten million pounds per square foot, while the crystals may have a modulus of thirty million or more pounds per square foot. Such a structure has both some resiliency and high strength and is somewhat analagous to a reinforced concrete structure, which is a common example of a two-phase material.

It is, therefore, a principal object of the invention to provide a glass foam with a larger number of smaller and more uniform bubbles therein.

It is another object of the invention to provide a glass foam having thinner bubble or cell walls to obtain improved insulating characteristics.

A further object of the invention is to make a glass foam with a heavy gas contained in the bubbles or cells of the foam to establish better insulating qualities.

Still another object of the invention is to make a glass foam having multi-phase glass in the walls of the bubbles or cells.

Still a further object of the invention is to provide a glass foam that can be made in separate steps whereby the glass can be shipped in a dense state and subsequently foamed at or near the point of use.

Figure 5:
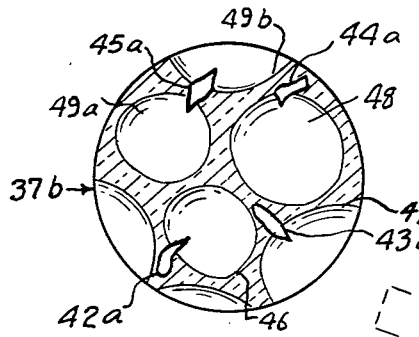
Figure 6:
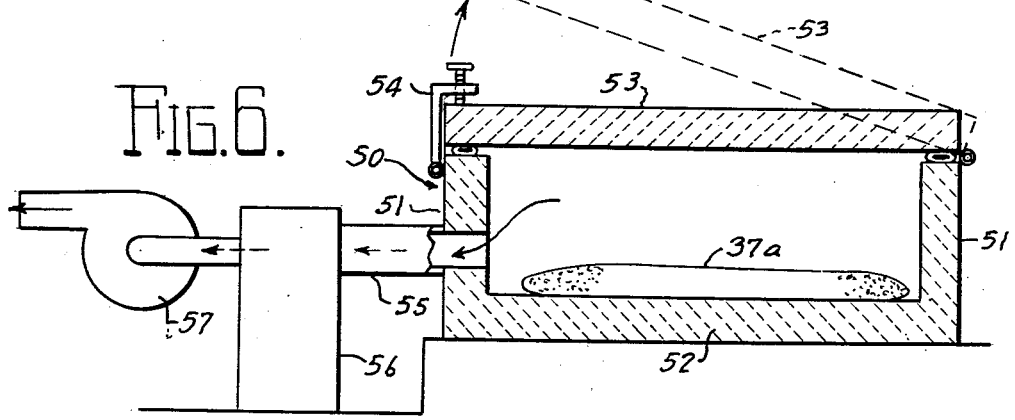
Figure 7:
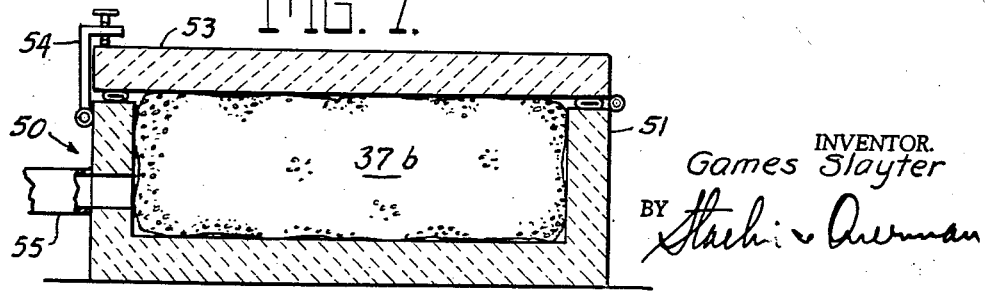

Other objects of the invention will be suggested from the following detailed description of preferred embodiments thereof, reference being made to the accompanying drawings, in which:

FIG. 1 is a schematic representation, in cross section, of a furnace in which glass is melted and processed, and a receptacle into which the processed glass is poured, FIG. 2 is a view in cross section of the receptacle and glass shown in FIG. 1 in place in a heat-treating furnace, FIG. 3 is a highly magnified, microscopic view of a portion of the glass in the receptacle shown in FIGS. 1 and 2 after heat-treatment in the furnace shown in FIG. 2, FIG. 4 is a view in cross section of the receptacle and glass shown in FIGS. 1 and 2 with the glass as it appears after further heat-treatment, FIG. 5 is a more highly magnified, microscopic view of a portion of the glass shown in FIG. 3, as indicated by dotted lines, after further heat-treatment and in the state shown in FIG. 4, FIG. 6 is a simplified view in cross section of a vacuum chamber and evacuating apparatus with treated glass therein, just before the container is evacuated, FIG. 7 is a view in cross section of the vacuum chamber shown in FIG. 6 after the chamber has been evacuated and the glass foam therein expanded, FIG. 8 is a somewhat schematic view of apparatus for producing heat-treated but unfoamed glass powder, FIG. 9 is a view partially in cross section of apparatus for producing glass foam insulation in situ from glass powder made with the apparatus shown in FIG. 8, FIG. 10 is a view in cross section of apparatus for producing glass foam structural members from pre-treated, unfoamed glass powder made with the apparatus shown in FIG. 8, FIG. 11 is a view in cross section of alternate apparatus for producing structural members from unfoamed glass powder made with the apparatus shown in FIG. 8, FIG. 12 is a view in cross section of a furnace and shaping members for producing a structural member from sheets of unfoamed glass, FIG. 13 is a view in cross section taken along line 13—13 of FIG. 12, FIG. 14 is a view in cross section similar to FIG. 13 but showing the glass after foaming, and with the upper shaping member removed, FIG. 15 is a chart illustrating nuclei forming and crystal forming ranges for a glass, and FIG. 16 is a time-temperature chart illustrating a heat-treating method according to the invention.

In practicing the invention, a suitable melt comprising a glass, and including a nucleating agent, is effected. The melt should be at a temperature well above its liquidus and also above its maximum devitrification temperature to assure that there are no undissolved crystals. The melt can be formulated in any suitable way, for example from a charge composed of batch, of a previously vitrified glass, of a plurality of glasses, or of a combination of batch with a glass or with glasses. A nucleating agent is mixed either with the charge or with the molten glass, and, in either event, should be distributed equally throughout the melt. It is preferred to mix the agent with a finely divided charge to minimize the difficulty of achieving uniform distribution thereof in the molten glass. Any of many nucleating agents can be used, for example, copper, gold, silver, tin, manganese, and cobalt. The best nucleating agent may be different for different glass constituents and for different uses to which the resulting foam will be put. The amount of nucleating agent used will also vary, particularly according to the ultimate use. In one instance, by way of example, for a given glass, 0.003 percent by weight of gold must be added to obtain 3.7 parts per million of 300 angstrom crystals, at 40 percent devitrification. With this amount of gold $450 \times 10^{15}$ nuclei per cubic inch of glass are theoretically possible. When this glass is foamed, bubbles or cells formed will have diameters of 1 to 5 mils and wall thickness of approximately ½ mil.

The terms "percent" and "parts" are used herein, and in the appended claims, to refer to percent parts by weight, unless otherwise indicated.

While the glass is at a temperature above its liquidus and above its maximum devitrification point, a heavy gas, such as sulfur dioxide, is dissolved therein, preferably to the saturation point. This can be accomplished by bubbling the gas through the molten glass. Larger volumes of the heavy gas can be dissolved by maintaining the molten pool of glass under pressure, as by means of an atmosphere of the heavy gas maintained under pressure above the pool. When the glass is saturated, it is quickly cooled below its minimum devitrification temperature to prevent escape of the gas and also to prevent uncontrolled formation of crystals therein.

The glass is then nucleated, as by heating it to a temperature within the "nucleating temperature range," which term is herein used to refer to a range within which the nucleating agent is preferentially formed as a large number of very small nuclei throughout the glass. A multiplicity of minute nuclei form in a glass containing a nucleating agent when that glass is subjected to a temperature within the nucleating range. This range can be wide or narrow and can cover very high or only intermediate temperatures. It will usually be above the strain point of the particular glass and may be above the maximum devitrification temperature for some glasses. Further, some glasses have two or possibly more nucleating temperature ranges—one at relatively high temperatures and one at intermediate temperatures. In the latter case, the nuclei will form much more slowly within the lower nucleating temperature range.

Rather than being heated directly to the nucleating range, at least some glasses can be first subjected to short-wave rays, such as ultra-violet rays, for a period of time and then heated within a nucleating temperature range. In such a case, the short-wave rays "trigger" sub-microscopic particles of the nucleating agent. These particles rapidly form nuclei when brought within the nucleating temperature range and heating time within this range can therefore be substantially reduced.

Within the nucleating range for any glass, the nucleating agent forms a multiplicity of nuclei or centers on which crystals grow during subsequent heat-treatment. The nuclei may be formed from molecules or atoms of the nucleating agent or agglomerations thereof. In some cases, the nuclei may actually be minute crystals that are caused by the agent to form from constituents of the glass batch. In any case, however, the nuclei form in large numbers and remain very small. The minute size probably is obtained because the glass lacks sufficient mobility in the lower nucleating range to enable any extensive agglomeration of the agent or glass constituents or because the glass is at too high a temperature in the upper nucleating range for constituents to come out of solution to any extent and form crystals. Any constituent of a glass tends to devitrify more readily at lower temperatures. Therefore, if nucleation is accomplished at a sufficiently high temperature, no constituent has any substantial tendency to devitrify, and the nuclei will remain minute. The glass is held at a temperature within the nucleating range for a predetermined length of time to produce nucleation to a desired extent. The glass is then in an activated condition.

The activated glass, which is still in dense form, is then heated or cooled to a temperature in the "crystal forming range" at which further devitrification and crystal growth occurs. The activated glass can be cooled and shipped in an activated condition for subsequent heating to a temperature in this range. The latter procedure effects substantial savings in shippings costs, as will be more fully discussed subsequently. The crystal forming range can be narrow or wide, depending upon glass composition, and can include high or intermediate temperatures. For some glasses, at least, the range will be just above the softening temperature range of the glass. In the crystal forming range, the nuclei that were previously formed now provide ready points of departure or centers about which devitrifying constituents of the glass collect. This occurs because the temperatures in the crystal forming range are low enough to cause a considerable quantity of the glass constituents to devitrify or be thrown out of solution, and yet are high enough that the devitrified constituents are mobile in the glass and can migrate to effect crystal growth. The crystals thus grow on the nuclei at a relatively rapid rate although substantially no new nuclei are formed.

The absolute and relative levels of the nucleating range and the crystal forming range will vary considerably from glass to glass; this is particularly true for the nucleating range which may be above or below the crystal forming range. Some glasses will have nucleating and crystal forming ranges that overlap. Such glasses are not preferred for use in making foam because close control of bubble formation cannot be obtained. This is true because nuclei formation and crystal growth will take place at the same time and with the result that fewer nuclei and crystals of varying size are formed. When the ranges do not overlap, however, the time the glass is maintained within the nucleating range provides a direct control over the number of nuclei formed, and the rate and uniformity of crystal growth can be independently controlled by selection of times and temperatures within the crystal forming range. The heavy gas in the glass will then form in bubbles around crystals which have grown to sufficient size to form points of departure for the gas from the glass. Further, the gas is substantially insoluble in the crystals. Therefore, the overall solubility of the gas in the glass is decreased because the portion of the glass is in the form of crystals. The bubbles tend to grow as the crystals grow, and larger bubbles tend to grow at the expense of smaller bubbles because the large ones have less gas to glass interface relative to their volume and, hence, are under less pressure, which is proportional to the interfacial area. The smaller bubbles thus tend to go back into solution and eventually come out of solution into the larger bubbles. If the glass were maintained at the crystal forming temperature long enough, the bubbles would grow to such a size that they would tend to drift toward the surface due to their buoyancy, and ultimately to escape. The glass is cooled, however, before bubble drifting occurs.

As the bubbles form and grow, the glass is transformed into a foam which is actually formed quite rapidly. If the foam remained in the crystal forming range for any length of time, it would collapse. However, if the foam is cooled to a point where the glass becomes quite viscous, the cell walls will have sufficient strength to stand up. Rapid cooling of the glass can be accomplished by such means as placing the foam in air or spraying it with a mist of a liquid coolant in a gas. However, the foam also has its own inherent cooling properties. When the heavy gas is thrown out of solution into its natural gaseous form, it absorbs considerable heat from the surrounding glass. This causes the glass to be rapidly and uniformly cooled. Such natural cooling can be supplemented with additional, external cooling, if deemed necessary in a particular application.

Where low apparent density foams are desired it may be advantageous to place the glass under a negative pressure as the foam is formed to enable the bubbles to expand to the extent desired.

By changing such variables as the amount and type of nucleating agent, the amount of gas, and the temperatures at which the glass is processed, the size and number of the bubbles and the apparent density of the resulting foam can be closely controlled. Generally, the greater the amount of nucleating agent, the larger will be the number of bubbles formed, and the greater the volume of dissolved gas, the larger will be the cell size. Both large cells and large numbers of cells tend to produce foams of low apparent density. Higher or lower processing temperatures, depending on the glass constituents, will also further this result. For example, if a glass foam insulation is desired with an apparent density of approximately 3–6 pounds per cubic foot, the amounts of nucleating agent and gas will be comparatively high, and the glass will be heated to the lower end of the nucleating temperature range and to the higher end of the crystal forming range to obtain a maximum number of large bubbles, and hence, low density.

Glass foam insulation with an apparent density below approximately 3 pounds per cubic foot has not been successfully produced, because the cell walls are so thin that holes are frequently left therein and the bubbles are inter-connected. It is desired to maintain each bubble as an individual, unconnected unit so that the foaming gas, such as sulfur dioxide which has a $k$ value about one-third that of air, will enhance the insulating characteristics of the glass foam. The importance of a heavy gas in the bubbles has been proven by experiments. Thus, a heavy gas, sulfur dioxide, was bled through a plastic foam which had an original $k$ value of approximately 0.22–0.24 B.t.u. per hour per square foot per degree Fahrenheit per inch of thickness. When filled with the heavy gas, the plastic foam, which had connected cells, attained a $k$ value of approximately 0.14. After the plastic foam was exposed to the atmosphere for several hours, the $k$ value again increased to approximately the original value because the heavy gas escaped therefrom.

The gas within the cells of a glass foam, after the foam is cooled to room temperature, is at sub-atmospheric pressure. This fact makes a heavy gas even more effective at reducing $k$ values of a foamed glass than at reducing the $k$ values of an open or connected celled plastic foam, as discussed in the preceding paragraph. It is known that the thermal conductivity of any gas begins to decrease sharply as its pressure approaches a perfect vacuum and that the heavier the gas, the higher will be the absolute pressure at which the thermal conductivity begins to decrease. The pressure of the sulfur dioxide in the foam will be about 4 p.s.i.a. At this pressure, the conductivity of the sulfur dioxide will be very low because it will be below the pressure at which conductivity of this gas starts to decrease sharply. Other heavy gases, i.e., gases having densities above 0.15 pound per cubic foot at standard conditions of 0° C. and atmospheric pressure, are also effective at reducing $k$ values of glass foam.

Synthetic lumber is also an important product that can be made from glass foam. Such lumber can be sawed, nailed, drilled, etc., as regular lumber, but is fireproof, vermin proof, and rot proof. For such use, glass foam can have an apparent density of approximately 10–12 pounds per cubic foot but may be as high as 30–40 pounds per cubic foot where higher strength is required. Strength is of greater importance for lumber than for insulation and, therefore, heavier cell walls are often preferred. For this reason, a smaller number of smaller cells are produced to obtain both proper strength and density. To obtain a large number of small bubbles, the glass foam can be heated initially to the upper end of the nucleating range and subsequently to the lower end of the crystal forming range.

For purposes of further illustration, and not of limitation, a specific form of the invention is set forth. A glass composition is employed having 80% $SiO_2$, 12.5% $LiO_2$, 2.5% $K_2O$, 4% $Al_2O_3$, 1% $ZnO$, 0.03% $CeO_2$, and 0.003% $Au$. The glass has both a nucleating range and a crystal forming range generally as indicated by curves F and G, respectively, in FIG. 15. Curves F and G are based on a chart in U.S. Patent to Blau, 2,132,390. This composiion is melted at 2460–2550° F. for approximately three to four hours under oxidizing conditions. Sulfur dioxide gas is then bubbled through the glass, while at temperature, until fully saturated. After this period of time, which is long enough to assure that all portions of the glass have reached temperature and have been there long enough to melt any impurities, the glass is then cooled and exposed to short-wave rays to "trigger" nuclei therein. Subsequently, the glass is heated to approximately 970° F. for only about two minutes, as indicated by the dotted lines of FIG. 16, in which time nuclei rapidly form because of the prior exposure of the glass to the short-wave rays. The glass is then heated to a temperature above its softening point to form crystals therein. The crystal forming temperature range is broad for this glass composition, at least, and can be as low as about 1200° F. or as high as about 1740° F. Crystals form in this temperature range, particularly rapidly at the upper portion thereof, and as they do so, the sulfur dioxide is thrown out of solution and forms bubbles of uniform size and distribution throughout the glass. When foaming is near completion, the glass is allowed to cool to maintain the foam in permanent shape.

The following discussion and accompanying drawings of specific apparatus for carrying out particular embodiments of the invention are presented only to show examples of the variety of forms in which the principles of the invention can be employed, and not to place limitations on the scope of the invention.

FIG. 1 shows a heat-treating furnace 21 having walls 22, a bottom 23, and burners that fire through ports 24. Glass batch is supplied through a supply passage 25 from a batch container 26. The batch melts as it comes up to temperature and forms a pool 27 which is tapped off through a pouring spout 28 into a receptacle or mold 29. A nucleating agent can be mixed in the batch supply or maintained in a container 30 and added to the molten pool 27 through a supply tube 31 having a spray nozzle 32 to spread a nucleating agent 33 uniformly over the pool 27. The nucleating agent is preferably supplied to the batch, however, because it can be more effectively mixed therewith than the molten glass, although the natural convection currents in the molten glass will mix the nucleating agent with the glass to a reasonable degree. A gaseous blowing agent is added to the pool 27 through ports 34 in a manifold 35 to which gas is supplied from a suitable source (not shown) through a supply tube 36. The pool 27 of glass is preferably saturated with the foaming gas and may be supersaturated if the furnace 21 is totally enclosed and an atmosphere of the gas is maintained under pressure over the pool 27.

The glass is preferably initially heated to a comparatively high temperature to assure complete vitrification and homogeneity. At lower temperatures, however, glass is capable of dissolving more of a gas. For example, in one glass 1¼% of sulfur dioxide, by weight, could be dissolved at 2400° F. while only ¼%, by weight, could be dissolved at 2500° F. It is, therefore, preferred to lower the temperature of the glass, after complete vitrification and homogenizing, before the glass is saturated with gas to enable dissolution of a maximum amount of gas. The glass should still be mobile at this lower temperature and should still be above the crystal forming range.

When the receptacle 29 is filled to a predetermined level with glass 37 that is tapped from the pool 27, the receptacle and glass are cooled rapidly below the devitrification temperature to prevent uncontrolled crystal growth in the glass. Cooling can be effected in the air or by a spray of water, or the receptacle 29 can be partially immersed in a liquid cooling medium, as water. The cooling rate is not critical but need only be sufficiently rapid to prevent uncontrolled formation and growth of crystals.

The receptacle 29 and the glass 37, after cooling, are placed in a chamber 38 of heat-treating furnace 39 (see FIG. 2) having a suitable heat source, as electrical elements 40. The pool 37 is heated to a temperature within the nucleating range for the particular glass and held at that temperature for a predetermined length of time. The glass can be subjected to short-wave rays prior to the subsequent heat-treatment, if desired. The nucleating agent, at the nucleating temperature, then causes a multiplicity of well dispersed, microscopic or submicroscopic nuclei 41 to be formed, as shown in FIG. 3, and activates the glass 37. The activated glass is shown at 37a in FIG. 3. The glass is held at a nucleating temperature until enough nuclei are formed to suit the ultimate use of the subsequently formed glass foam. At this temperature, many small nuclei are formed but do not grow to any extent because the glass is not sufficiently mobile, or because insufficient quantities of batch constituents tend to come out of solution. The nuclei will constitute one or more atoms or molecules of the nucleating agent, with or without a small addition of crystalline material formed from the batch constituents.

After the glass 37 is at a nucleating temperature for the proper period of time, the temperature of the furnace 39 is then brought within the crystal forming range. The activated glass 37a can be left in the chamber 38 during the temperature change or can be removed from the chamber 38 before subsequent heat-treatment. In the latter case the glass can be brought to a crystal forming temperature with the furnace or placed in a hot furnace maintained at that temperature. In any case, the glass 37a is subsequently heated in the furnace 39 or any other suitable furnace to a temperature within the crystal forming range, at which temperature the nuclei are able to grow into crystals at a rapid rate. The nuclei, for example those designated 42–45, inclusive, in FIG. 3, grow rapidly into crystals, for example those designated 42a–45a, inclusive in FIG. 5. Bubbles 46–48, inclusive, form around the crystals 42a–44a, inclusive. Two or more bubbles, such as bubbles 49a and 49b, form on two or more corners of some crystals. The formation of these bubbles occurs principally because the sharp corners or points of the crystals form points of departure for the gas and further because as the crystals form, the solubility of the gas in the glass mass is decreased since the crystals themselves hold very little gas.

As the bubbles form and expand, the activated glass 37a is changed to a glass foam 37b which can have a volume as much as 30 or 40 times the volume of the glass 37a. This transformation will occur relatively rapidly and at atmospheric pressure, at least in some instances. For some glasses, particularly where very low apparent density insulating foams are desired, the glass 37a can be transferred to a vacuum chamber 50, shown in FIGS. 6 and 7, after being subjected to a temperature within the crystal forming range for a given period of time. The chamber 50 has walls 51, a bottom 52, and a hinged top 53 of suitable strength to withstand the force exerted by atmospheric pressure. The top 53 is held tightly against the walls 51 by a latch 54. Air is exhausted from the vacuum chamber 50 through a pipe 55, a receiver 56, and a vacuum pump 57. The receiver 56 is employed primarily to smooth pulsations and eliminate the possibility of foam or other foreign bodies being pulled into the pump. The vacuum should be formed rapidly in the chamber before the glass cools excessively. The vacuum is established as quickly as possible after the glass 37a is placed in the chamber 50 and the top 53 is latched. The glass 37a will then quickly expand into the foam 37b and fill the chamber 50 as shown in FIG. 7. The walls 51 and the bottom 52 of the chamber 50 can be heated, if desired, to prevent excessive cooling of the glass during foam formation. The temperature of the walls and bottom of the chamber should not be high enough to cause the glass to be excessively soft, however, because if the glass remains too soft the foam which is formed will tend to collapse. The glass foam will have cooled considerably during the foaming process, as the foaming gas transforms into a vapor, and this cooling should not be hindered by placing the foam in contact with hotter surfaces or in a hotter chamber.

Variations of the above technique can be employed for particular purposes and uses. For example, foam can be made in powder form with the apparatus shown in FIG. 8. In this case, the melting furnace 21, or other suitable furnace, can be employed to melt glass batch and form the pool 27. The glass is then poured, continuously in this case, through the pouring spout 28 to form a layer 58 of molten glass on a belt 59 of a conveyor 60. As the glass layer 58 travels along the belt 59, it cools quickly and, when sufficiently cooled, is crushed by any suitable apparatus such as crushing rollers 61. Crushed glass particles 62 are then transferred to a belt 63 of a second conveyor 64 and passed through such a mechanism as pulverizing rollers 65. Finely ground glass powder 66 is produced by the rollers 65 and transferred onto a conveyor 67 which carries the powder 66 through a heat-treating furnace 68 where the glass powder 66 is heated to a temperature within the nucleating range. The time that the powder 66 is maintained at this temperature can be controlled by regulating the speed of the conveyor 67 and by changing the length of the furnace 68. The powder 66 is thereby transformed into nucleated or activated glass powder 66a which is then dumped into a hopper 69 having a supply tube 70 by means of which shipping bags 71 can be filled with the activated glass powder 66a. The glass can also be nucleated before being ground, if desired, by placing the furnace 68 before the rollers 61 or 65. For some glasses, suitable ultra-violet or other lamps can be placed in front of the furnace 68 to "trigger" nucleation in the glass layer 58 or glass powder 66.

The bags 71 of the dense, unfoamed, but activated glass powder 66a can then be shipped to another point for further processing. For example, such glass can be shipped by a glass manufacturer to an article manufacturer who produces articles in which insulation is to be formed in situ. In such a case, when the bags 71 are received by the article manufacturer, the glass 66a is dumped into a hopper 72, shown in FIG. 9. From the hopper 72, the glass 66a passes through a supply tube 73 that is disposed downwardly toward electrodes 74 between which an arc 75 is struck. As the glass 66a passes through the arc 75, it is heated quickly to a temperature within the crystal forming temperature range which enables the nuclei that were formed therein at the glass manufacturer's site to grow quickly into crystals and cause bubbles to form, as before. The temperature of the arc and the duration of pellet subjection thereto are preferably controlled so that the pellets are heated to an upper end of the crystal forming range. Crystals then can grow during both heating and cooling of the pellets through the range, and a maximum amount of time is provided for crystal growth and bubble formation. Also, the period of growth can be extended by using glasses with broad crystal forming ranges. Foamed nodules 76 are formed, each having one or more bubbles sealed therein, and are dropped or blown into an article 77 which can be any of a variety of articles, such as refrigerator doors and walls, building blocks or the like. The foamed nodules are very effective for use as insulation because each bubble has gas sealed therein, as is true of the glass foam discussed in connection with FIGS. 1-7. The articles 77 can be carried adjacent one another on a conveyor 78 to enable a continuous, rapid operation.

Shipping costs are greatly reduced by the use of the method illustrated in FIGS. 8 and 9 because the volume of the dense nodules 66a may be as little as $\frac{1}{30}$ to $\frac{1}{40}$ the volume of foamed powder or nodules 76. This is simply accomplished by separating the steps of heating the gas to a temperature within the nucleating range and subsequently to a temperature within the crystal forming range. This method has the further advantage of combining the separate manufacturing steps of producing the foam and placing it in the article.

The foam insulation can also be employed in honeycomb structures by using the above method. In this instance, the foam can be blown directly into the honeycombs. Further, the foam can be adhered in a layer to metal sheets and faced with plastic or metal applied as a frit or by a hot spray apparatus. This provides a strong, attractive panel having good insulating properties.

Boards and other structural materials can be made by this two stage process. Thus, dense, unfoamed powder or thin sheets of nucleated glass can be produced by a glass manufacturer and shipped to the user or distributor with substantial savings in shipping costs. For example, if glass having a density of 150 pounds per cubic foot is to be foamed and made into boards having an apparent density of 15 pounds per cubic foot, a 10–1 ratio, then only $\frac{1}{10}$ of the shipping space formerly needed is consumed. In other words ten times as much "lumber" can be transported in a railroad car.

FIG. 10 shows apparatus for making boards from the dense, unfoamed powder 66a. In this case, the powder 66a can be dumped from the bag 71 into a hopper 79 having a supply spout 80 that feeds the powder 66a into a high velocity blast of combustion products from any suitable burner 81 having a nozzle 82 in the form of a slot of any substantial length. The spout 80 will also have a length substantially equal to the width of the blast from the burner 81 to supply the powder 66a substantially uniformly thereto. The width of a subsequently formed layer of nodules will then be determined by the length of the burner nozzle 82 and the length of the spout 80. The powder is rapidly heated to the crystal forming range of the glass and thereby forms crystals and bubbles as is true of the powder 66a passed through the electric arc 76 shown in FIG. 9. The temperature of the flame from the burner can be regulated by the amount of excess air employed in the air-fuel mixture supplied to the burner 81 to prevent the powder 66a from being heated too rapidly or to a temperature above the crystal forming range. Foamed nodules 83 are thus formed and projected into the space between belts 84 and 85 of conveyors 86 and 87. The glass used for this method has a crystal forming temperature range high enough so that the surfaces of the individual foamed nodules 83 will be sufficiently fluid to stick to one another. The nodules 83 will thus form an integral mass as they impinge upon other nodules in the space between the belts 84 and 85. The nodules 83 thereby form an integral layer 88 that can be trimmed and used as a board or other structural member, sawed into strips and used as a plurality of narrower boards, or adhered to similar layers 88 by means of an adhesive such as asphalt and used as a thicker, laminated board. After forming, the glass foam layer 88 is preferably annealed to relieve stresses therein and to reduce the possibility of cracking. For this reason, the layers 88 are preferably thin and laminated after annealing to produce a structure of a desired thickness. This enables the annealing time to be considerably decreased and, hence, the length of the annealing furnace to be correspondingly decreased, because the time required for proper annealing varies directly with the square of the thickness of the layers.

The annealing operation for the layer 88 can be accomplished immediately after forming. Thus, in the apparatus of FIG. 10, the layer 88 is passed over a plate 89 at a charge end opening 90 of an annealing furnace 91 and onto a conveyor 92 contained within the furnace. In this case, the rate of travel of the layer 88 through the furnace 91 is determined by the rate of transformation of the nodules 83 into the layer 88. Therefore, the length of the furnace 91 or the temperature therein must be changed to change the annealing time. When the now-annealed layer 88 reaches a discharge opening 93, it is transferred onto one of the plates 89 and moved out of the furnace 91. It is then in a tough, strong state and ready for use after any desired trimming and laminating processes.

In some instances it may be desirable to form structural or other integral materials under a vacuum to produce lighter foams than is otherwise possible. FIG. 11 shows apparatus for producing such materials in this manner. The powder 66a is dumped from the bag 71 into the hopper 79 and passed through the spout 80 into the high velocity blast from the nozzle 82 of the burner 81. Foamed nodules 83 are thus produced as with the apparatus shown in FIG. 10 but the nodules 83 are now emitted through a tapered opening of a tube 94 that can be either round or rectangular in cross section. An air nozzle 96 is formed between canted plates 97 which are integral parts of the tube 94 and a second tube 95. Air is introduced into the tube 95 through the nozzle 96 and flows to the right toward the discharge end of the tube 95. The air flows into the nozzle 96 from a manifold 98 that surrounds the tube 95, and to which air is supplied from a supply pipe 99. The flow of air through the nozzle 96 inspirates air from the tube 94, and establishes a partial vacuum therein. The nodules 93 are thereby subjected to a negative pressure, so that they expand more fully. An integral layer 100 of the nodules 83 is formed and is pulled from the tube 95 by means of conveyors 101 and 102, aided by the flow of air from the nozzle 96 through the tube 95. The layer 100 can be annealed and processed in the same manner as the layer 88.

FIGS. 12-14 show apparatus for producing boards from sheets of dense, unfoamed activated glass. A sheet 103 of such activated glass can be made with the apparatus shown in FIG. 8 if the crusher 61 and the pulverizer 65 are not used. Thus, the glass layer 58 from the furnace 21 is fed directly into the oven 68 where it is nucleated to produce the sheet 103. This sheet can then be shipped to a distributor in the same manner as the bags 71 of the powder 66a. The sheet 103 can then be processed in the apparatus of FIGS. 12-14. Such sheet is placed in the space enclosed by two C-shaped members 104 and 105 and placed in a suitable furnace 106 in which the sheet 103 is heated to a temperature within the crystal forming range of the glass. The glass is caused to foam as the crystals grow, in the manner discussed in conjunction with FIGS. 1-7. As soon as a foam 107 is formed from the sheet 103, the combination of the members 104 and 105 and the foam 107 is removed from the furnace 106 and the members 104 and 105 are stripped from the foam 107 to enable the foam to cool rapidly. The side walls of the members 104 and 105 can be slightly tapered to facilitate removal of the foam. The foam 107 is then in the form of a finished board, shaped by the members 104 and 105, and requires no trimming. The boards should be annealed, however, to obtain maximum toughness and for this reason the boards are preferably laminated from thinner layers to facilitate annealing, as previously discussed.

Foam according to the invention is thus particularly adapted for structural and insulating uses but can be employed in various applications to advantage. The two-phase nature of the cell walls greatly increases the strength and abrasion resistance of the glass and makes it considerably more suitable for structural uses. The spherical nature of the cells, formed by the relatively high surface tension inherent in the very small cells, also adds materially to the strength of the foam. This represents a marked improvement over previously known foams, which are characterized by larger, 14-sided bubbles. The heavy gas contained in the cells or bubbles has little effect on structural advantages of glass foam but considerably enhances the insulating properties. The minute size of the cells keeps convection of the gases therein at a minimum and also reduces heat transfer.

Various modifications will be suggested from the above described embodiments of the invention. Such modifications can be made without departing from the scope of the invention as determined by the depending claims.

What I claim is:

1. The method of making a glass foam which comprises melting a glass and a nucleating agent to a homogeneous state, supplying a gas below the surface of the molten melt and dispersing the gas through the melt, maintaining the glass at a temperature within its nucleation range to cause the formation of nuclei therein, and heating the resulting glass to a temperature within a crystal forming range of the glass in which crystals grow, thereby causing the dissolved gas to be thrown out of solution to cause foam generation.

2. The method of making a glass foam which comprises melting a glass and a nucleating agent to a homogeneous state, supplying a gas below the surface of the molten melt and dispersing the gas through the melt, forming nuclei in the glass, heating the resulting glass to a temperature within its crystal forming range, and maintaining the glass at a temperature within the latter range until crystals form around nuclei formed during nucleation of the glass and the crystals grow to a sufficient size that dissolved gas is thrown out of solution to cause foam generation.

3. The method of producing glass foam as claimed in claim 2 wherein the glass is cooled after nucleation and subsequently heated to a temperature within its crystal forming range.

4. The method of making glass foam as claimed in claim 3 wherein the cooled glass is crushed to a powder, before the glass powder is heated to a temperature within its crystal forming range.

5. The method of making a glass foam which comprises melting glass batch and a nucleating agent to a homogeneous state, adding a gas having a density of at least 0.15 pound per cubic foot under standard conditions below the surface of the melt when the melt is hot and dispersing the gas therethrough to cause dissolution thereof in the melt, maintaining the melt at a temperature within a nucleating range of the glass for a period of time sufficient to cause nuclei to form therein, heating the resulting glass to a temperature within its crystal forming range, and maintaining glass at a temperature within the latter range until crystals form around the nuclei therein and grow to a sufficient size that gas is thrown out of solution to cause foam generation.

References Cited in the file of this patent

UNITED STATES PATENTS

| | | |
|---|---|---|
| 1,394,296 | Fisher | Oct. 18, 1921 |
| 1,814,012 | Taft | July 14, 1931 |
| 2,113,818 | Sullivan | Apr. 12, 1938 |
| 2,118,707 | Ingouf | May 24, 1938 |
| 2,119,259 | Slayter | May 31, 1938 |
| 2,132,390 | Blau | Oct. 11, 1938 |
| 2,197,562 | Reinker | Apr. 16, 1940 |
| 2,255,236 | Willis | Sept. 9, 1941 |
| 2,255,238 | Willis | Sept. 9, 1941 |
| 2,264,246 | Lytle | Nov. 25, 1941 |
| 2,314,804 | Willson | Mar. 23, 1943 |
| 2,381,945 | Field et al. | Aug. 14, 1945 |
| 2,628,160 | Stookey | Feb. 10, 1953 |
| 2,920,971 | Stookey | Jan. 12, 1960 |
| 2,937,938 | Fiedler et al. | May 24, 1960 |
| 3,054,139 | Bartholomew et al. | Sept. 18, 1962 |

OTHER REFERENCES

"Phase Diagrams for Ceramists," by Levin, McMurdie and Hall, published by The American Ceramic Society, Columbus, Ohio, 1956, pp. 14-25 and 206. (Copy available in Div. 56.)